US008897698B2

(12) United States Patent
Jeon et al.

(10) Patent No.: US 8,897,698 B2
(45) Date of Patent: Nov. 25, 2014

(54) DATA TRANSFER METHOD, DATA TRANSMISSION APPARATUS, AND COMMUNICATION SYSTEM IN MULTI-HOP RELAY SYSTEM

(75) Inventors: Young Hyun Jeon, Guri-si (KR); Tak Ki Yu, Yongin-si (KR); Jong Hyung Kwun, Seoul (KR); Chan Ho Min, Seoul (KR); Min Suk Kang, Daejeon Metropolitan (KR); Hyu Dae Kim, Daegu Metropolitan (KR); Bang Chul Jung, Daejeon Metropolitan (KR); Dong Won Lee, Daejeon Metropolitan (KR)

(73) Assignees: Samsung Electronics Co., Ltd., Suwon-si (KR); Korea Advanced Institute of Science and Technology, Daejeon Metropolitan (KR)

(*) Notice: Subject to any disclaimer, the term of this patent is extended or adjusted under 35 U.S.C. 154(b) by 533 days.

(21) Appl. No.: 13/132,794

(22) PCT Filed: Dec. 4, 2009

(86) PCT No.: PCT/KR2009/007229
§ 371 (c)(1),
(2), (4) Date: Jun. 3, 2011

(87) PCT Pub. No.: WO2010/064867
PCT Pub. Date: Jun. 10, 2010

(65) Prior Publication Data
US 2011/0294415 A1 Dec. 1, 2011

(30) Foreign Application Priority Data
Dec. 4, 2008 (KR) .................. 10-2008-0122646

(51) Int. Cl.
*H04B 7/14* (2006.01)
*H04B 7/26* (2006.01)

(52) U.S. Cl.
CPC .................. *H04B 7/2606* (2013.01)
USPC ............. 455/15; 455/11.1; 455/13.1; 455/16; 455/20; 455/428; 370/279; 370/293; 370/315; 375/211; 342/15; 342/353

(58) Field of Classification Search
CPC .... H04B 1/7107; H04B 1/1027; H04B 1/715; H04B 7/15592; H04B 7/2606; H04W 28/04; H04W 52/244; H04W 52/42; H04W 72/046; H04W 84/005; H04W 84/12
USPC ......... 455/15, 7, 9, 11.1, 13.1, 16, 17, 20, 22, 455/24, 41.2, 408, 450, 455, 3.05; 370/278, 370/279, 293, 274, 315, 492, 501; 375/211, 375/214; 342/15, 353
See application file for complete search history.

(56) References Cited

U.S. PATENT DOCUMENTS

| | | | |
|---|---|---|---|
| 2007/0129008 A1* | 6/2007 | Shi et al. .................. | 455/11.1 |
| 2007/0280116 A1 | 12/2007 | Wang et al. | |
| 2008/0043815 A1 | 2/2008 | Hart et al. | |
| 2008/0107073 A1 | 5/2008 | Hart et al. | |
| 2008/0274692 A1* | 11/2008 | Larsson .................. | 455/24 |
| 2009/0181708 A1* | 7/2009 | Kim et al. .................. | 455/501 |

* cited by examiner

*Primary Examiner* — Shaima Q Aminzay
(74) *Attorney, Agent, or Firm* — Jefferson IP Law, LLP (57) ABSTRACT

The invention relates to a data transfer method in a multi-hop relay system. The data transfer method comprises: a step for allowing a base station to receive from a first terminal the channel information ($H_{d,1}$) between the base station and the first mobile station, a step for making the base station generate an interference cancellation precoding matrix using $H_{d,1}$, a step for forcing the base station to transfer first data to a relay station, and a step for making the relay station transfer the first data to the first mobile station and forcing the base station to transfer second data to a second mobile station, wherein the second data is converted using the interference cancellation precoding matrix. According to the disclosed data transfer method in the multi-hope relay system, the base station transfers data to another mobile station efficiently when the relay station transfers data to a mobile station. Therefore, the data transfer method is able to efficiently use the resources wasted in an existing data transfer method and improve the total data transmission rate of the base station.

16 Claims, 8 Drawing Sheets

- First time slot    - Second time slot

Conventional (300)

| BS → RS (301) | RS → MS (302) |

Preposed (350)

| BS → RS (351) | RS → MS$_k$ (352)<br>BS → MS$_i$ (353) |

DATA TRANSFER METHOD, DATA TRANSMISSION APPARATUS, AND COMMUNICATION SYSTEM IN MULTI-HOP RELAY SYSTEM

TECHNICAL FIELD

The invention relates to multi-hop relay systems. More particularly, this invention relates to a method, apparatus and system that allows a base station to perform a downlink data transmission, while minimizing the interference between signals, by using multi-input/multi output (MIMO) technology.

BACKGROUND ART

In broadband wireless access communication systems, communication is made between a base station and mobile stations via one direct link, i.e., a wireless communication link with high reliability. However, the fixed location of a mobile station reduces the flexibility in the configuration of a wireless network. This makes it difficult to provide efficient services in a wireless environment where traffic distribution or the amount of call requests varies greatly. In order to resolve this problem, broadband wireless access communication systems employ a relay system that transmits data in a multi-hop form using relay stations near the relay system. In addition, multi-hop relay systems can rapidly re-configure a network in response to a change in an ambient environment, and also manage the entire wireless network more efficiently. Therefore, a self-control adaptive wireless communication network, requested in the next generation mobile communication systems, can be implemented based on a multi-hop relay broadband wireless access communication system.

In a multi-hop relay communication system, a relay station operates in half-duplex mode. The relay station switches a reception mode, where it receives data from a base station, to a transmission mode, and then transmits signals to mobile stations via time slots. When a relay station transmits signals to one mobile station, while a base station is transmitting data to the other mobile stations, the signals transmitted from the base station interfere with the signals transmitted from the relay station to the mobile stations. In that case, the base station experiences limited data transmission.

While the base station transmits data to a relay station via a downlink in the first time slot and then the relay station transmits data to mobile stations in the second time slot, the base station cannot transmit new data to the relay station. Therefore, a conventional data transmission method and system requires twice the amount of time to transmit data from a base station to mobile stations compared to a case where the base station could transmit data without interrupting the data transmission, thereby wasting resources.

DISCLOSURE

Technical Problem

The invention solves the above problems, and provides a method, apparatus and system that allow a base station to transmit downlink data, via a relay station, to mobile stations by minimizing the inference between one mobile station receiving the downlink data and the other mobile stations, in a manner that the downlink data is transmitted from the base station to the relay station in a first time slot and then from the relay station to the mobile stations in a second time slot, thereby preventing the wastage of resource in a multi-hop relay communication system.

Technical Solution

In accordance with an exemplary embodiment of the invention, a, including a method for transmitting data in a multi-hop relay system, the method including: receiving, by a base station, information regarding a channel ($H_{d,1}$) between the base station and a first mobile station, from the first mobile station; generating, by the base station, an interference removal precoding matrix, using the channel information ($H_{d,1}$); transmitting, by the base station, the first data to a relay station; and transmitting, by the relay station, the first data to the first mobile station, and transmitting, by the base station, the second data, transformed using the interference removal precoding matrix, to the second mobile station. Preferably, the method may further include: receiving, by the base station, information regarding channels between the base station and two or more mobile stations, from the two or more mobile stations other than the first mobile station; and setting, by the base station, one from among the two or more mobile stations, which has the highest transmission rate when the interference removal precoding matrix is applied, as the second mobile station, using information regarding channels between the base station and two or more mobile stations.

Advantageous Effects

As described above, the invention provides the method, apparatus and system according to the invention can allow a base station to efficiently transmit data to other mobile stations while a relay station transmits data to a mobile station, thereby efficiently using resources that would have been wasted in conventional data transmission systems, and also enhancing the rate of transmission for all data in the base station.

DESCRIPTION OF DRAWINGS

The features and advantages of the invention will become more apparent from the following detailed description in conjunction with the accompanying drawings, in which.

BEST MODE

Hereinafter, exemplary embodiments of the invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the invention.

The terms or words described in the present description and the claims should not be limited by a general or lexical meaning, instead should be analyzed as a meaning and a concept through which the inventor defines and describes the invention at his most effort, to comply with the idea of the invention. Therefore, one skilled in the art will understand that the embodiments disclosed in the description and configurations illustrated in the drawings are only preferred embodiments, instead there may be various modifications, alterations, and equivalents thereof to replace the embodiments at the time of filing this application.

Figure 1:
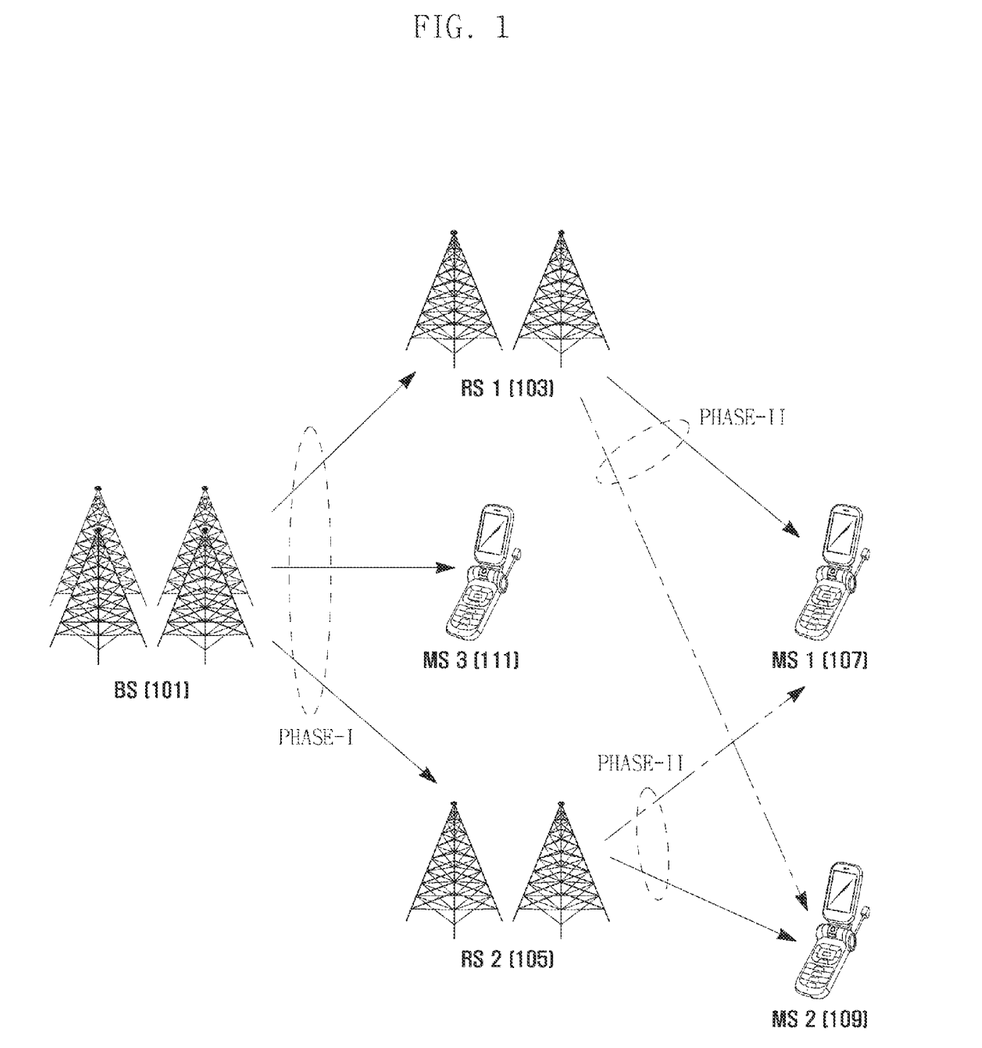
FIG. 1 illustrates a schematic configuration of a conventional multi-hop relay system.

FIG. 1 illustrates a schematic configuration of a conventional multi-hop relay system.

Referring to FIG. 1, there is a mobile station 1 (MS3) 111 that is within the coverage area of the base station 101 and is directly linked to a base station 101. There are a mobile station 1 (MS1) 107 and a mobile station 2 (MS2) 109 that are out of the coverage area of the base station 101 and have a worse channel state with the base station 101. The MS2 107 and MS3 109 are linked to the base station 101, via a relay station 1 (RS1) 103 and a relay station 2 (RS2) 105, respectively. When mobile stations 107 and 109, located in a gap out of the coverage area of the base station 101 or shielded by buildings, try to communicate with the base station 101, they require relay stations 103 and 105 in order to secure better wireless channels and then are linked to the base station 101 via the channels. Therefore, the base station 101 can provide a fast data channel in cell boundary areas where channel states are deteriorated, by employing a multi-hop relay technology, and can thus extend the cell service area.

A broadband wireless access communication system employing a multi-hop relay technology uses a frame with two transmission sections with respect to the time axis, which is called 'PHASE,' in order to perform communication via the relay stations 103 and 105. That is, transmission is made between a base station and relay station or between a base station and a mobile station, in PHASE-I in the frame, i.e., communication is performed via a direct link. Likewise, transmission is also made between a relay station and a mobile station, in PHASE-II, by reusing frequency, i.e., relay communication is performed where the relay station transmits, to the mobile station, information that the relay station received from the base station during the PHASE-I. In the PHASE-II transmission process, the electromagnetic waves transmitted by the relay station act as signals (refer to the solid line in FIG. 1) to the mobile station linked thereto, and as the interference (refer to the dashed line in FIG. 1) to mobile stations adjacent thereto.

As described above, the base station is limited in such a manner to transmit data to the other mobile stations in PHASE-II. In order to resolve this problem, a relay system with spatial reuse has been proposed that transmits data using the same resource, via relay stations that are within one cell but spaced apart from each other in such a way that they don't cause interference. However, the relay system with spatial reuse is disadvantageous in that a base station has the burden of a signal system where it informs relay stations of simultaneously transmitting data and manages them. In addition, the relay system with spatial reuse has also a drawback in that a downlink scheduler of a base station requires a large quantity of feedback information and this increases overheads in the system.

When there is an environment where there are two source nodes and a relay node, a two-phase relaying technique is used so that the source nodes simultaneously transmit data to the relay node in the first time slot and the relay node broadcasts data to the source nodes in the second time slot. The two-phase relaying technique is proper in an ad-hoc communication environment where source nodes transmit/receive data to/from a relay node; however it is not proper in a communication system that includes a base station, a relay station, and mobile stations. It is preferable that the two-phase relaying technique is implemented to have channels with channel gains that are similar to each other in order to enhance the performance because the performance of channels between the base station and the relay station is superior to that of channels between the relay station and mobile stations.

Therefore, when a relay station transmits data to mobile stations using multi antennas of a base station, via a downlink in a multi-hop relay system, the invention proposes a technique that allows the base station to transmit data, via the same resource.

Figure 2:
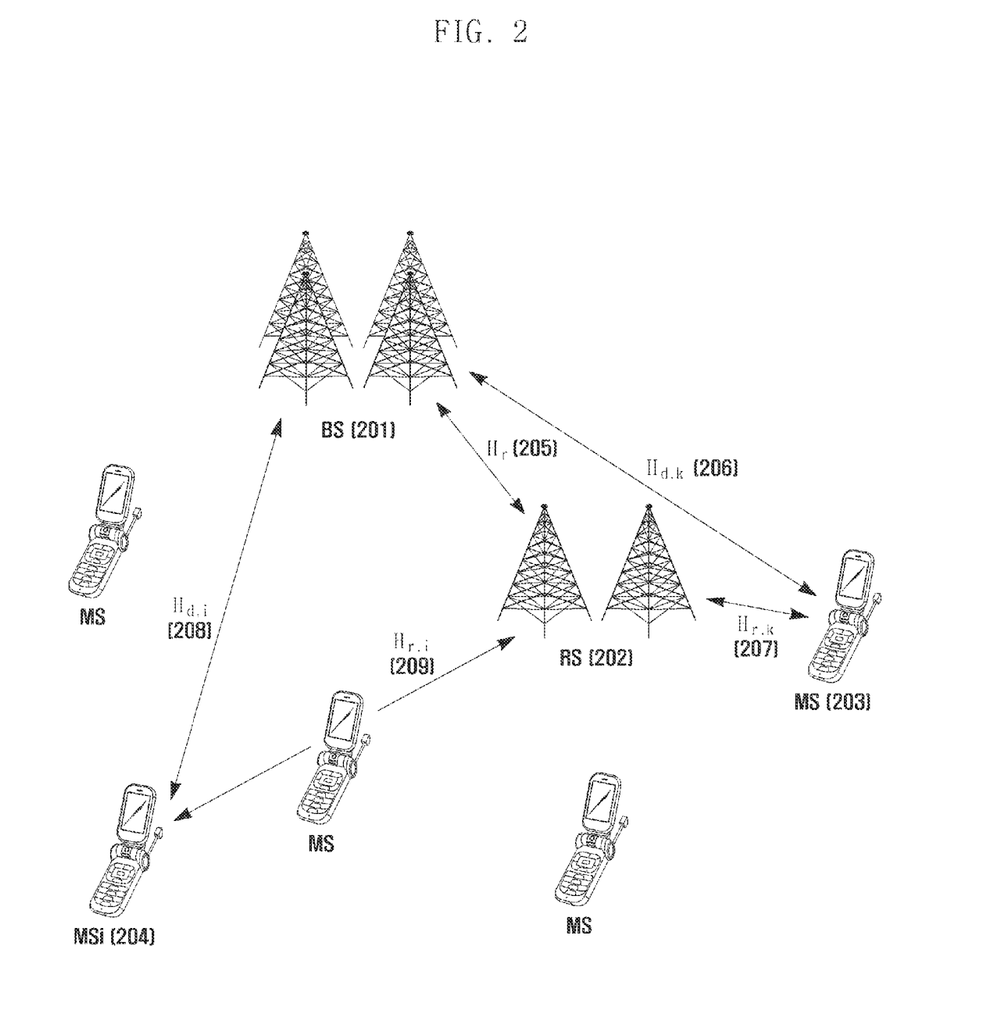
FIG. 2 illustrates a schematic configuration of a multi-hop relay system according to an embodiment of the invention.

FIG. 2 illustrates a schematic configuration of a multi-hop relay system according to an embodiment of the invention.

Referring to FIG. 2, the multi-hop relay system includes a base station 201, a relay station 202, and a number of mobile stations 203 and 204. For the sake of convenient description, it is assumed that the base station 201 has one relay station, for example relay station 202, in the coverage area of a cell under the control and there is one mobile station receiving data via the relay station 202, for example, a first mobile station 203. As shown in FIG. 2, a wireless channel is denoted by $H_r$ 205 between the base station 201 and the relay station 202. Likewise, a wireless channel is denoted by $H_{d,k}$ 206 between the base station 201 and the first mobile station 203 linked to the relay station 202. In addition, a wireless channel is denoted by $H_{r,k}$ 207 between the relay station 202 and the first mobile station 203. In that case, the first mobile station 203 receives signals $r_{k,1}$ and $r_{k,2}$ in the first and second time slots, respectively, according to a conventional data transmission method. Signals $r_{k,1}$ and $r_{k,2}$ can be expressed by the following equations (1) and (2).

$$r_{k,1} = H_{d,k} s + n_1$$

$$H_{d,k} \in C^{N_{MS} \times N_{BS}}, s \in C^{N_{BS} \times N_{stream}} \quad \text{[Equation 1]}$$

$$r_{k,2} = H_{r,k} s + n_2 \quad \text{[Equation 2]}$$

Where $n_1$ and $n_2$ denote interference signals, s denotes stream, $N_{MS}$ denotes the number of antennas in the first mobile station 203, $N_{BS}$ denotes the number of antennas in the base station 201, and $N_{stream}$ is the number of streams.

As described above, the conventional data transmission method is performed in such a manner that: in the first time slot, the base station 201 transmits data to the relay station 202; and, in the second time slot, the relay station 202 transmits the data to the first mobile station 203 but the base station 201 does not perform data transmission.

However, the data transmission method according to the invention further includes transmitting, by the base station 201, data to the second mobile station 204 in the second time slot. The base station 201 can transmit data to the second mobile station 204 in the second time slot, using a multiple antenna technology. The invention proposes two types of signal processing methods: a nulling method and a prewhitening method. First, the nulling method creates a precoding signal by projecting a signal to a null space of $H_{d,k}$ channel 206, and originally removes the interference from the first mobile station 203 that receives data from the relay station 202 in the second time slot, using the precoding signal. Second, the prewhitening method is a method where, when the base station 201 transmits data to the second mobile station 204, the signals transmitted from the base station 201 to the second mobile station 204 causes the interference in $H_{d,k}$ channel 206 so that the interference features white noise.

In the nulling method, although the base station 201 transmits data to the second mobile station 204 in the second time slot, $H_{d,k}$ channel 206 does not cause any interference. Therefore, in the second time slot, communication between the relay station 202 and the first mobile station 203 can be performed, separately from the operation of the base station 201. The following equation (3) expresses signal $r_{k,1}$ that the first mobile station 203 receives in the first time slot by employing the nulling method. The following equation (4) expresses signal $r_{k,2}$ that the first mobile station 203 receives in the second time slot by employing the nulling method. The following equation (5) expresses signal $r_{i,2}$ that the second mobile station 204 receives in the second time slot. Precoding matrix V refers to a signal satisfying equation $H_{d,k}V=0$.

$$r_{k,1} = H_{d,k}s_k + n_{k,1}$$

$$H_{d,k} \in C^{N_{MS} \times N_{BS}}, s_k \in C^{N_{stream} \times 1} \quad \text{[Equation 3]}$$

$$r_{k,2} = H_{r,k}s_k + H_{d,k}Vs_i + n_{k,2} = H_{r,k}s_k + n_{k,2} \quad \text{[Equation 4]}$$

$$r_{1,2} = H_{d,i}Vs_i + n_{i,2} \quad \text{[Equation 5]}$$

Where $n_{k,1}$, $n_{k,2}$, and $n_{i,2}$ denote interference signals. $s_k$ denotes streams of the first mobile station, and $s_i$ denotes streams of the second mobile station.

As expressed in equation (4), the interference signal received by the first mobile station 203 is cancelled. To this end, the base station 201 restricts the number of data streams that can be transmitted in the second time slot, which is expressed as the following equation (6).

Max. Number of stream at the $2^{nd}$time-slot=min{
$(N_{BS}-N_{MS1}),N_{MS2}$}

Where $N_{BS}$, $N_{MS1}$ and $N_{MS2}$ denote the number of antennas of the base station, the first and second mobile stations, respectively.

In the prewhitening method, the base station 201 transmits a signal, multiplied by a precoding matrix W, to the second mobile station 204. This signal causes an interference in the first mobile station 203 that receives data via the relay station 202 in the second time slot, where the inference is white Gaussian noise. The first mobile station 203 keeps communicating with the relay station 202 as per a conventional method, without using an interference removal technique. It is preferable that the first mobile station 203 defines a value of additional noise (Q) and transmits data to the relay station, considering the additional noise (Q), when the relay station determines the rate of data transmission.

The following equation (7) expresses signal $r_{k,1}$ that the first mobile station receives in the first time slot when employing a precoding matrix W to which a prewhitening method is applied. The following equation (8) expresses signal $r_{k,2}$ that the first mobile station receives in the second time slot when employing a precoding matrix W to which a prewhitening method is applied. The following equation (9) expresses signal $r_{i,2}$ that the second mobile station receives in the second time slot.

$$r_{k,1} = H_{d,k}s_k + n_{k,1} \quad \text{[Equation 7]}$$
$$H_{d,k} \in C^{N_{MS} \times N_{BS}}, s_k \in C^{N_{stream} \times 1},$$
$$n_{k,1} \in C^{N_{MS} \times 1}(0, N_0 I)$$

$$r_{k,2} = H_{r,k}s_k + H_{d,k}Ws_i + n_{k,2} \quad \text{[Equation 8]}$$
$$= H_{r,k}s_k + H_{d,k}(H_{d,k})^+ \sqrt{Q/P_s}\, s_i + n_{k,2}$$
$$= H_{r,k}s_k + \sqrt{Q/P_s}\, s_i + n_{k,2}$$
$$= H_{r,k}s_k + \tilde{n}_{k,2}(\tilde{n}_{k,2} \in C^{N_{MS} \times 1}(0, (Q+N_0)I))$$

$$r_{i,2} = H_{d,i}Ws_i + n_{i,2} \quad \text{[Equation 9]}$$

As expressed in equation (8), the interference part is simply modeled in the form of white Gaussian noise. This means that the level of white Gaussian noise can be simply adjusted in the first mobile station. In the prewhitening method, the maximum number of streams, through which data can be transmitted in the second time slot, is the number of antennas of a base station.

Referring to equation (8), it will be noted that the Q value affects the rate of data transmission. For example, the larger the Q value, the more the interference affects the first mobile station. In that case, the first mobile station decreases the rate of data transmission. On the contrary, when the Q value is relatively small, although the first mobile station 203 is only slightly affected, the second mobile station 204 decreases the rate of data transmission. This is because the base station 201 transmits data using low transmission power. Therefore, it is required to set a proper Q value for this system.

Figure 3:
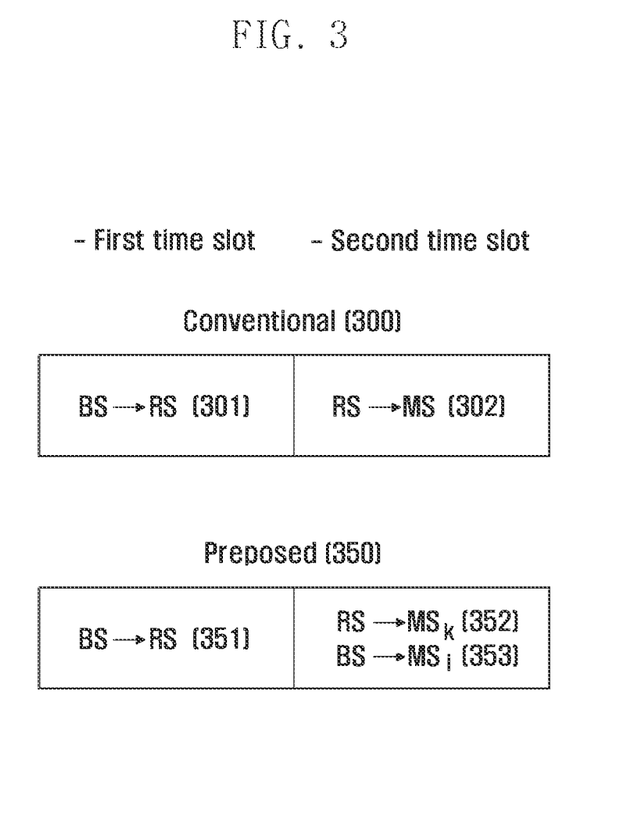
FIG. 3 illustrates a view that compares the data transmission method according to an embodiment of the invention with a conventional data transmission method.

FIG. 3 illustrates a view that compares the data transmission method according to an embodiment of the invention with a conventional data transmission method. It is assumed that $MS_k$ refers to a mobile station linked to a relay station and $MS_i$ refers to a mobile station to which a base station transmits data in the second time slot.

Referring to FIG. 3, the conventional transmission method (300) is performed in such a manner that: a base station (BS) transmits data to a relay station (RS) in the first time slot 301 and the RS transmits data to the $MS_k$ in the second time slot 302. On the contrary, the transmission method according to an embodiment of the invention is performed in such a manner that: BS transmits data to RS in the first time slot 351; and RS transmits data to $MS_k$ in the second time slot 352 and BS simultaneously transmits data to $MS_i$ using the same resource. Therefore, the transmission method of the invention can prevent resources from being wasted and efficiently perform data transmission, unlike the conventional data transmission method.

Figure 4:
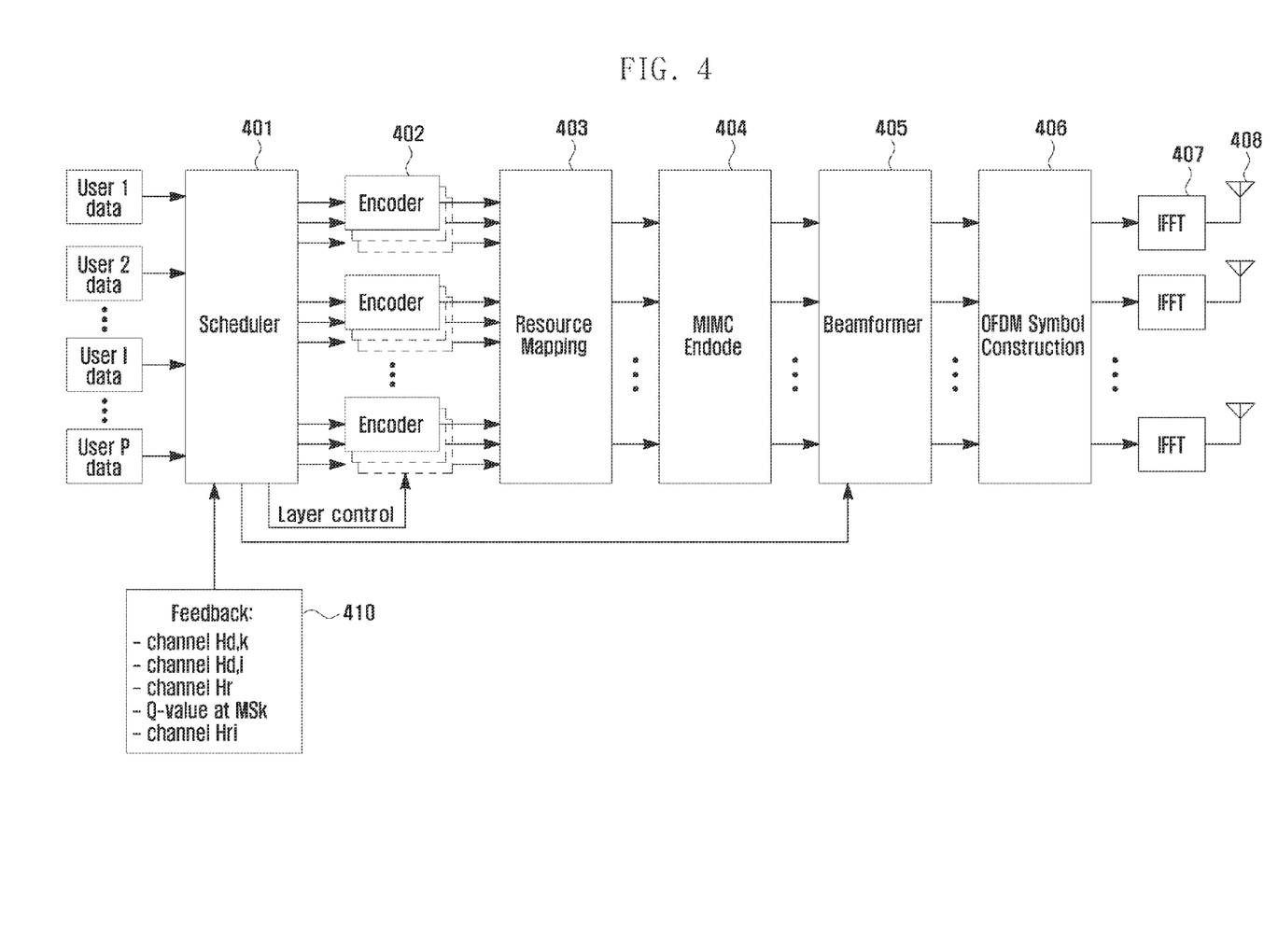
FIG. 4 illustrates a schematic block diagram of a transmitter according to an embodiment of the invention.

FIG. 4 illustrates a schematic block diagram of a transmitter according to an embodiment of the invention.

Referring to FIG. 4, the transmitter includes a scheduler 401, an encoder 402, a resource mapping unit 403, a MIMO encoder 404, a beamformer 405, an OFDM symbol generating unit 406, an IFFT processor 407, an RF transmitting unit 408, and a feedback receiving unit 410.

The feedback receiving unit 410 receives information regarding channels $H_{d,k}$, $H_{d,i}$, and $H_r$, periodically fed back from mobile stations, and outputs it to the scheduler 401.

The scheduler 401 buffers information regarding channels of respective mobile stations based on a certain size of window, calculates an amount of change in average channels using a certain number of pieces of buffered channel information, and predicts the next channel state using the latest channel information and the amount of change in average channels. After that, the scheduler 401 determines the scheduling priority of mobile stations using the predicted channel states for respective mobile stations, allocates resources according to the priority, and controls data transmission according to the result of resource allocation. In particular, the scheduler 401 receives information regarding channels, $H_{d,k}$, $H_{d,i}$, and $H_r$, from the feedback receiving unit 410, and outputs it to the beamformer 405.

The encoder 402 encodes data from the scheduler 401 by burst unit and outputs the encoded data. An encoding rate of a corresponding burst is determined according to the scheduling result of the scheduler 401. The encoder 402 may be implemented with a convolutional encoder, a turbo encoder, a convolutional turbo code (CTC) encoder, a low density parity check (LDPC) encoder, etc.

The resource mapping unit 403 maps encoded data from the encoder 402 to subcarriers according to the scheduling result of the scheduler 401 and outputs them. That is, the resource mapping unit 403 maps encoded data to subcarriers and arranges them in frame units. The arranged encoded data is synchronously output in order of OFDM symbol units.

The MIMO encoder 404 exchanges bits of an OFDM symbol from the resource mapping unit 403, so that the OFDM symbol can be multi-output via a number of antennas (up to the number, M).

The beamformer 405 is included in a receiver, so that the receiver can support MIMO mode. The receiver generates a precoding matrix 420 based on feedback information from the scheduler 401, and applies it to signals. That is, the beamformer 405 generates a precoding matrix for a nulling method or a prewhitening method, and applies it to signals.

The OFDM symbol generating unit 406 outputs the arranged encoded data, synchronously, in order, in an OFDM symbol unit. The IFFT processor 407 operates the symbols from the OFDM symbol generating unit 406, based on Inverse Fast Fourier Transform (IFFT), transforms them to sampling data in time domain, and outputs the sampling data with a cyclic prefix (CP). The RF transmitting unit 408 includes frequency synthesizers and filters. The RF transmitting unit 408 transforms data from the IFFT processor 407 to signals in an RF band and then transmits them.

Figure 5:
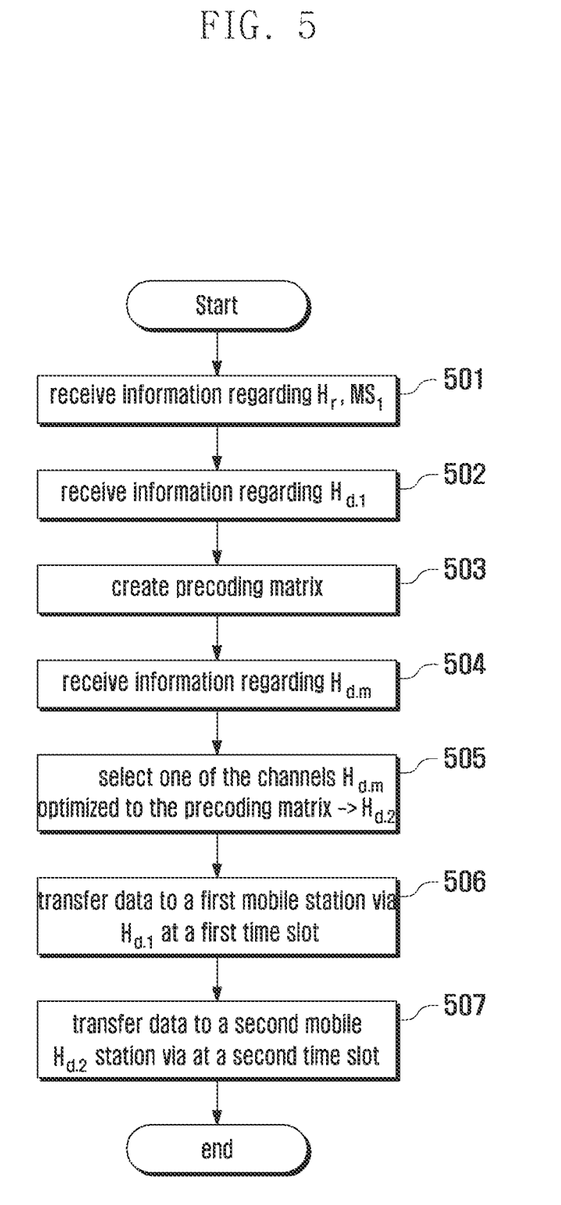
FIG. 5 illustrates a flow chart that describes a method for transmitting data in a base station, according to an embodiment of the invention.

FIG. 5 illustrates a flow chart that describes a method for transmitting data in a base station, according to an embodiment of the invention.

Referring to FIG. 5, the base station receives information regarding channel $H_r$ between the base station and a relay station (501). The base station also receives information regarding a first mobile station $MS_1$ to which the relay station transmits data in the second time slot. The base station also receives information regarding channel $H_{d,1}$ between the base station and the $MS_1$ (502). The base station applies a nulling or prewhitening technique to signals, using the information regarding channel $H_{d,1}$, and generates a corresponding precoding matrix (503).

After that, the base station receives feedback via channels $H_{d,m}$ linked to a number of mobile stations that can receive data in the second time slot (504). A number of mobile stations can feed back the channel states, considering the interference caused by the relay station. When the amount of interference is not below a preset value, the base station may employ an opportunistic feedback mode where it does not feed back the channel states.

From among channels $H_{d,m}$ linked to a number of mobile stations, the channel $H_{d,2}$ is selected that has the highest rate of transmission when a precoding matrix is applied thereto, and a mobile station linked to the channel $H_{d,2}$ is determined as a second mobile station $MS_2$ (505). The base station transmits data, which will be transmitted to the first mobile station, to the relay station, via channel $H_r$ (first time slot) (506). In addition, the base station transmits data to the second mobile station via channel $H_{d,2}$, using a precoding matrix (507). During this process, the relay station transmits data to the first mobile station (second time slot).

Figure 6:
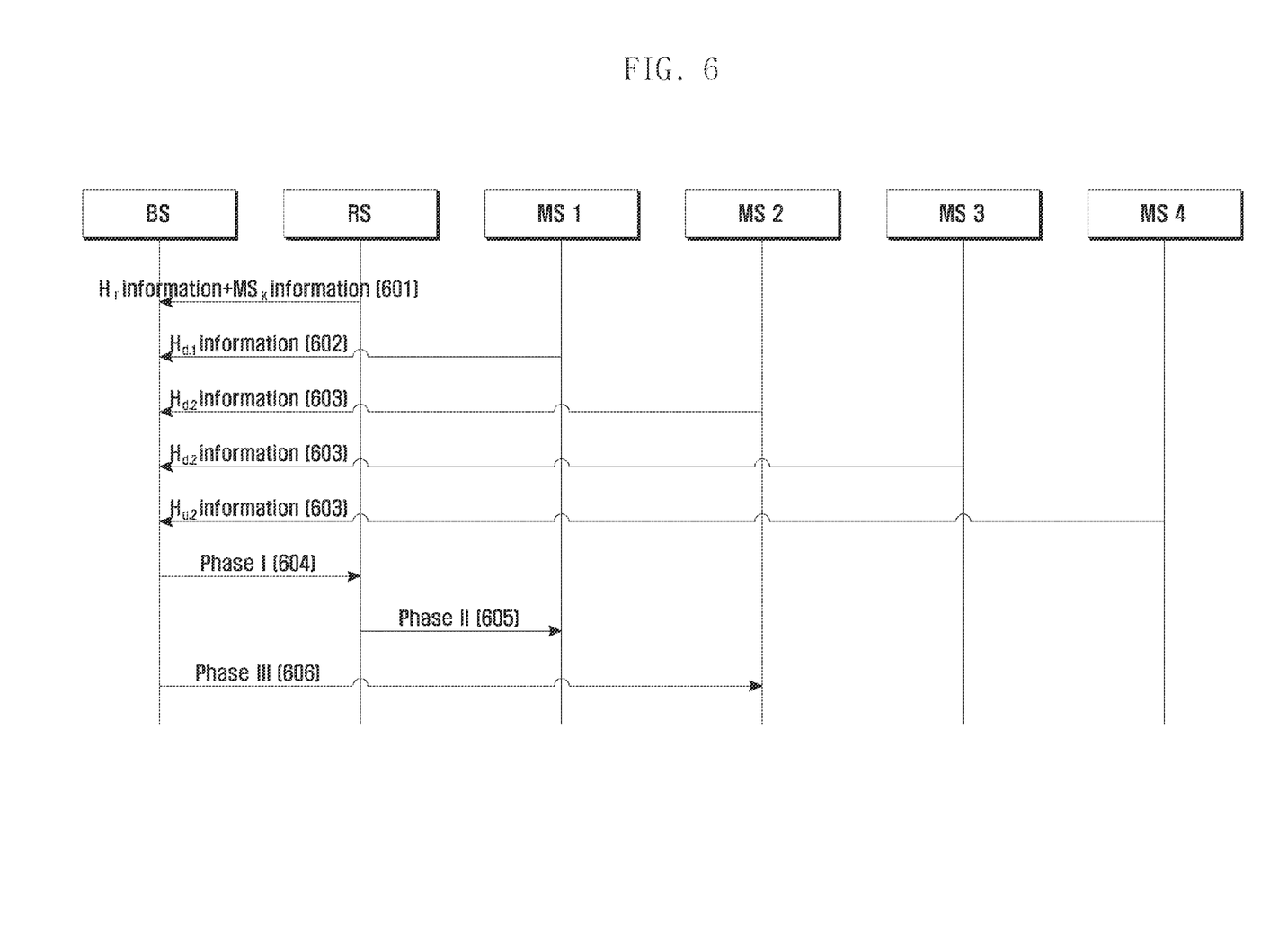
FIG. 6 illustrates a signal flow chart that describes a flow of signals between a base station, a relay station, and mobile stations, according to an embodiment of the invention.

FIG. 6 illustrates a signal flow chart that describes a flow of signals between a base station, a relay station, and mobile stations, according to an embodiment of the invention.

Referring to FIG. 6, the relay station transmits, to the base station, information regarding channel $H_r$ between the relay station and the base station (601). During this process, the relay station may also transmit, to the base station, information regarding the first mobile station $MS_1$ to which the relay station transmits data in the second time slot. The first mobile station $MS_1$ transmits, to the base station, information regarding channel $H_{d,1}$ between the first mobile station $MS_1$ and the base station (602). The base station applies a nulling or prewhitening technique to the received information, and generates a corresponding precoding matrix.

A number of mobile stations under the control of the base station transmit, to the base station, information regarding channels between them and the base station (603). A number of mobile stations can feed back the channel states to the base station, considering the interference caused by the relay station. The base station selects channel $H_{d,2}$ from among channels linked to a number of mobile stations, which has the highest rate of transmission when a precoding matrix is applied thereto, using the received information, and determines a mobile station linked to the channel $H_{d,2}$ as a second mobile station $MS_2$.

After that, the base station transmits data, which will be transmitted to the first mobile station, to the relay station, via channel $H_r$ (604). This, step 604, is performed in the first time slot. The relay station transmits data to the first mobile station $MS_1$ (605). The base station transmits data to the second mobile station via channel $H_{d,2}$, using a precoding matrix (606). These steps 605 and 606 are performed in the second time slot.

Figure 7:
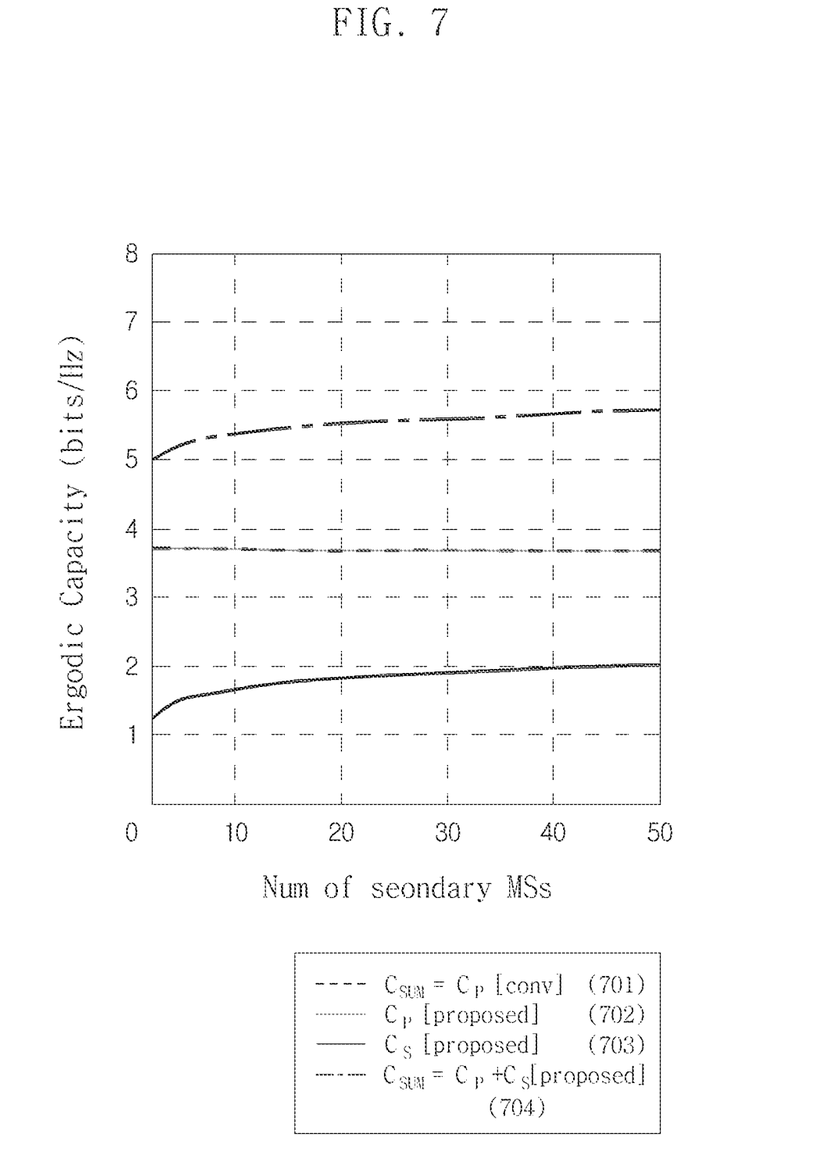
FIG. 7 illustrates graphs that show the rate of data transmission in a base station when data is transmitted by using a nulling technique, according to an embodiment of the invention, compared with that of a conventional data transmission method.

FIG. 7 illustrates graphs that show the rate of data transmission in a base station when data is transmitted by using a nulling technique, according to an embodiment of the invention, compared with that of a conventional data transmission method. The vertical axis denotes the rate of data transmission and the horizontal axis denotes the number of mobile stations that can receive data in the second time slot.

Referring to FIG. 7, the conventional data transmission method shows a curve 701 flat, which means it has the same data transmission rate regardless of the number of mobile stations that can receive data in the second time slot. On the contrary, the data transmission method according to the invention increases the data transmission rate, illustrated by curve 703, as the number of mobile station increases, without affecting the data transmission rate of a mobile station linked to a given relay station, illustrated by curve 702. Therefore, when data transmission is performed by applying a nulling technique, the data transmission rate of the base station, illustrated curve 704, increases remarkably, compared with that of the conventional data transmission method.

Figure 8:
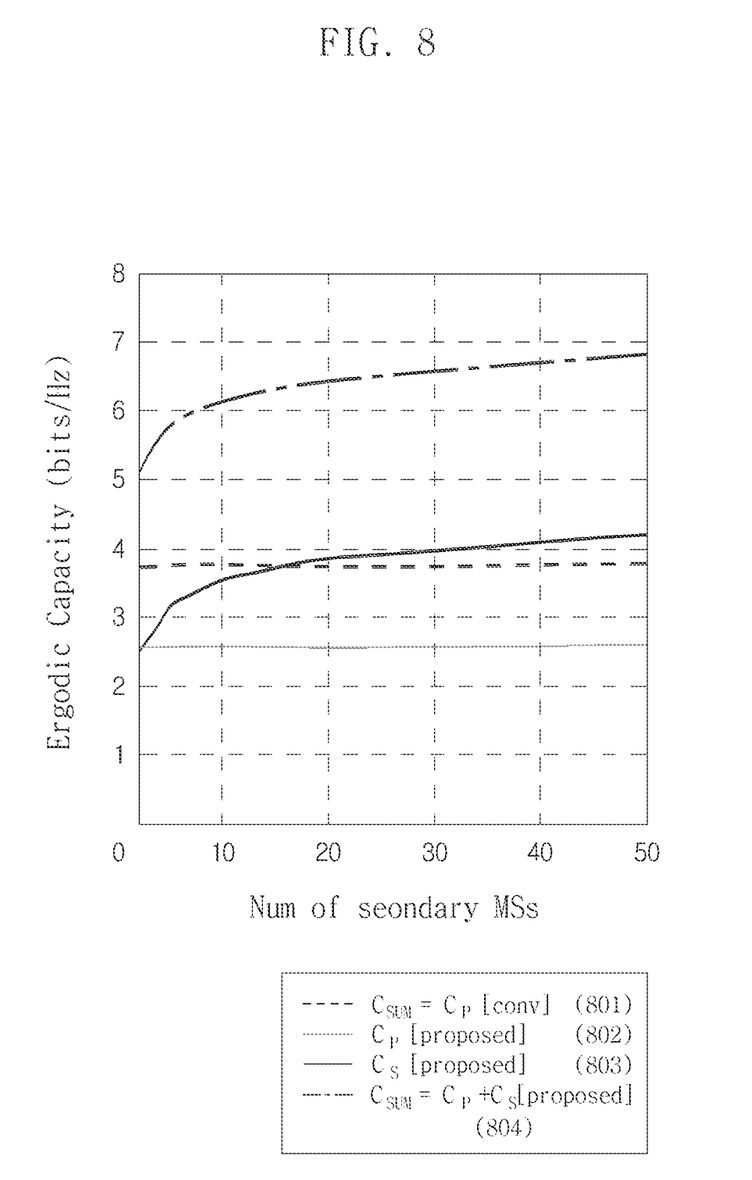
FIG. 8 illustrates graphs that show the rate of data transmission in a base station when data is transmitted by using a prewhitening technique, according to an embodiment of the invention, compared with that of a conventional data transmission method.

FIG. 8 illustrates graphs that show the rate of data transmission in a base station when data is transmitted by using a prewhitening technique, according to an embodiment of the invention, compared with that of a conventional data transmission method. The vertical axis denotes the rate of data transmission and the horizontal axis denotes the number of mobile stations that can receive data in the second time slot.

Referring to FIG. 8, compared with the data transmission rate of the conventional data transmission method, illustrated by curve 801, the data transmission rate to the first mobile station, illustrated by curve 802, shows the performance degradation that is caused in the second time slot, because of the amount of interference (Q). However, a rate of data transmission is created that can allow for the additional transmission of data. Therefore, the total rate of data transmission can be acquired by adding the two data transmission rates, and this is larger than the rate of the conventional data transmission method.

INDUSTRIAL APPLICABILITY

Although the preferred embodiments of the invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for transmitting data in a multi-hop relay system, comprising:
   receiving, by a base station, information regarding a channel between the base station and a first mobile station, from the first mobile station;
   generating, by the base station, an interference removal precoding matrix, using the channel information;
   transmitting, by the base station, a first data to a relay station, wherein the relay station transmits the first data to the first mobile station; and
   transmitting, by the base station, a second data to a second mobile station, using the interference removal precoding matrix without relaying of the relay station.

2. The method according to claim 1, further comprising:
   receiving, by the base station, information regarding channels between the base station and two or more mobile stations, from the two or more mobile stations other than the first mobile station; and
   setting, by the base station, one from among the two or more mobile stations, which has the highest transmission rate when the interference removal precoding matrix is applied, as the second mobile station, using information regarding channels between the base station and two or more mobile stations.

3. The method according to claim 2, wherein the interference removal precoding matrix is signals that belong to a null space of the information regarding channel.

4. The method according to claim 3, wherein the interference removal precoding matrix is received, by the first mobile station, as white Gaussian noise.

5. The method according to claim 1, wherein the base station transmits the second data to the second mobile station and the relay station transmits the first data to the first mobile station during an identical time slot.

6. The method according to claim 1, further comprising:
   selecting, by the base station, the second mobile station to which the base station transmits the second data at the same time as the relay station transmits the first data to the first mobile terminal, from among a plurality of mobile stations with which the base station is in communication, based at least in part on respective transmission rates between the plurality of mobile stations and the base station.

7. An apparatus for transmitting data in a multi-hop relay system, comprising:
   a feedback receiving unit for receiving information regarding a channel linked to a first mobile station;
   a scheduler for managing data to be transmitted and scheduling transmission of the data; and
   a beamformer for generating an interference removal precoding matrix using the information regarding a channel, and applying the interference removal precoding matrix to data to be transmitted to a second mobile station without relaying of the relay station.

8. The apparatus according to claim 7, wherein:
   the feedback receiving unit receives information regarding channels linked to two or more mobile stations, from the two or more mobile stations other than the first mobile station; and
   the scheduler sets one from among the two or more mobile stations, which has the highest transmission rate when the interference removal precoding matrix is applied, as the second mobile station, using information regarding channels between the two or more mobile stations.

9. The apparatus according to claim 8, wherein the interference removal precoding matrix is signals that belong to a null space of the information regarding channel.

10. The apparatus according to claim 8, wherein the interference removal precoding matrix is received, by the first mobile station, as white Gaussian noise.

11. A system for performing communication in a multi-hop relay system, comprising:
    a base station; and
    a relay station,
    wherein the relay station receives a first data from the base station and transmits it to a first mobile station, and
    wherein the base station: receives information regarding a channel between the base station and a first mobile station, from the first mobile station; generates an interference removal precoding matrix, using the channel information; and transmits a second data to a second mobile station without relaying of the relay station, using the interference removal precoding matrix, when the relay station transmits the first data to the first mobile station.

12. The system according to claim 11, wherein the base station: receives information regarding channels between the base station and two or more mobile stations, from the two or more mobile stations other than the first mobile station; and sets one from among the two or more mobile stations, which has the highest transmission rate when the interference removal precoding matrix is applied, as the second mobile station, using information regarding channels between the base station and two or more mobile stations.

13. The system according to claim 12, wherein the interference removal precoding matrix is signals that belong to a null space of the information regarding channel.

14. The system according to claim 12, wherein the interference removal precoding matrix is received, by the first mobile station, as white Gaussian noise.

15. The of system according to claim 12, wherein the base station transmits the second data to the second mobile station and the relay station transmits the first data to the first mobile station during an identical time slot.

16. The system according to claim 11, wherein the base station selects the second mobile station to which the base station transmits the second data at the same time as the relay station transmits the first data to the first mobile terminal, from among a plurality of mobile stations with which the base station is in communication, based at least in part on respective transmission rates between the plurality of mobile stations and the base station.

* * * * *